United States Patent [19]

Ushirokawa et al.

[11] 4,415,680

[45] Nov. 15, 1983

[54] WATER-IMPERMEABLE POLYOLEFIN FOAM AND PROCESS FOR PREPARING THE SAME

[75] Inventors: Masahiro Ushirokawa, Settsu; Takeshi Iwahama, Yao; Kenichi Senda, Akashi, all of Japan

[73] Assignee: Kanegafuchi Kagaku Kogyo Kabushiki Kaisha, Osaka, Japan

[21] Appl. No.: 427,142

[22] Filed: Sep. 29, 1982

Related U.S. Application Data

[63] Continuation of Ser. No. 217,983, Dec. 18, 1980, abandoned.

[51] Int. Cl.$^3$ ............................................... C08J 9/24
[52] U.S. Cl. ...................................... 521/56; 264/53; 264/DIG. 9; 264/DIG. 18; 521/60; 521/59
[58] Field of Search .......... 264/53, DIG. 9, DIG. 18; 521/56, 60

[56] References Cited

U.S. PATENT DOCUMENTS

| | | | |
|---|---|---|---|
| 2,823,213 | 7/1974 | Stastny et al. | 521/95 |
| 2,948,664 | 8/1960 | Rubens et al. | 521/60 |
| 3,616,365 | 10/1971 | Stastny et al. | 521/60 |
| 3,709,806 | 1/1973 | Minami et al. | 521/60 |
| 3,743,611 | 7/1973 | Muroi et al. | 521/56 |
| 3,953,558 | 4/1976 | Hatano et al. | 521/56 |
| 3,959,189 | 5/1976 | Kitamori | 521/60 |
| 4,108,934 | 8/1978 | Rubens et al. | 521/56 |
| 4,247,650 | 1/1981 | Shmizu et al. | 521/56 |
| 4,275,023 | 6/1981 | Shmizu et al. | 521/56 |

*Primary Examiner*—Morton Foelak
*Attorney, Agent, or Firm*—Armstrong, Nikaido, Marmelstein & Kubovcik

[57] ABSTRACT

A substantially water-impermeable polyolefin foam made of expandable polyolefin beads. The polyolefin foam is prepared by a particular process in which after heating expandable polyolefin beads and before cooling the heated beads in a mold, the heated beads were allowed to stand in the state that the polyolefin resin maintains the flowability.

7 Claims, 1 Drawing Figure

U.S. Patent         Nov. 15, 1983         4,415,680
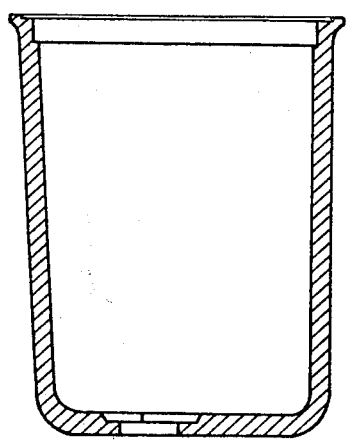

WATER-IMPERMEABLE POLYOLEFIN FOAM AND PROCESS FOR PREPARING THE SAME

This is a continuation of application Ser. No. 217,983, filed Dec. 18, 1980, now abandoned.

BACKGROUND OF THE INVENTION

The present invention relates to a substantially water-impermeable polyolefin foam made of expandable beads by bead foaming and a process for preparing the same.

In recent years, a polyolefin foam made by bead foaming has been employed widely in uses such as a vessel, a float, a buoy and a heat insulating material. However, a conventional polyolefin foam made by bead foaming has the disadvantage that when the foam keeps contacting with a liquid such as water, the liquid permeates into and is included in the foam in a short period of time, consequently resulting in various troubles such as leakage of liquid from a vessel made of the foam, decrease of buoyancy and decrease of heat insulating effect. For such a reason, there are strongly desired a water-impermeable polyolefin foam and a bead foaming process for the industrial preparation thereof.

The foaming technique concerning the polyolefin foam by bead foaming is attended with high difficulties, and its technical development was behind the development of polystyrene foam. Polystyrene is in general an amorphous high polymer and, therefore, the bead foaming thereof is carried out by utilizing the change in characteristics in the vicinity of the glass transition temperature and is relatively easy, whereas a polyolefin is in general a crystalline high polymer and, therefore, the bead foaming thereof is carried out by utilizing the change in characteristics in the vicinity of the melting point of crystal region. However, the control of the foaming condition of a polyolefin is very difficult because the change in characteristics in the vicinity of the melting point of crystal region is very sudden as compared with the change in the vicinity of the glass transition temperature. Consequentially, in case of a polyolefin foam made by bead foaming, the condition of the interface between the melt-adhered beads is apt to become bad, and after foaming, a large number of not melt-adhered portions are apt to remain between beads as voids or gaps.

It is an object of the present invention to provide a novel polyolefin foam which is substantially impervious to water.

A further object of the present invention is to provide a process for preparing a substantially water-impermeable polyolefin foam by bead foaming.

These and other objects of the present invention will become apparent from the description hereinafter.

SUMMARY OF THE INVENTION

The present inventors have found that the three-dimensionally continuous void or gap portion between expanded beads constituting a polyolefin foam serve as a path for a liquid such as water which permeates into and is contained in the polyolefin foam and finally leaks from the foam, and on the basis of this knowledge, have accomplished the present invention.

In accordance with the present invention, there is provided a substantially water-impermeble polyolefin foam made of expandable polyolefin beads. There is also provided a process for preparing a substantially water-impermeable polyolefin foam which comprises the steps of filling a mold with expandable polyolefin beads, heating the expandable beads to melt-adhere the surface of the beads to each other and to expand the beads, allowing the resulting heated beads to stand in the state that the polyolefin resin maintains its flowability, cooling the heated beads and taking out the resulting foam from the mold.

BRIEF DESCRIPTION OF THE DRAWING

The accompanying drawing is a section view showing a polyethylene foam prepared in Example 1 according to the present invention.

DETAILED DESCRIPTION

The term "polyolefin foam made of expandable beads" or "polyolefin foam" as used herein means a molded article obtained by a bead foaming, that is to say, by filling a mold with expandable resin particles (hereinafter referred to as "expandable beads") prepared by introducing a foaming agent under pressure into, mixing it with or impregnating it in a polyolefin resin, and then heating the expandable beads to melt-adhere the surface of the beads to each other and to expand and agglomerate the beads.

The term "substantially water-impermeable foam" as used herein means, for instance, a foam of which the volume (equilibrium value) of the leakage of a pressurized air of $0.020$ kg./$cm^2$G through its thickness is not more than 10 ml./100 $cm.^2$ min., preferably not more than 5 ml./$cm.^2$ min., more preferably not more than 2 ml./100 $cm^2$ min. Also, as a practical measure of the substantial water-impermeability, there is exemplified the case where a foam is continuously brought into contact with water, and in that case, for instance, the substantial water-impermeability means that no permeation of water is observed even after 24 hours, preferably 48 hours in continuous contact of a foam having a thickness of about 15 mm. with water of 30 cm. in water pressure. In case of a known polyolefin foam prepared by a conventional bead foaming method, water permeates noticeably into the foam in 24 hours in continuous contact with water of 30 cm. in water pressure and shortly leaks though depending on the thickness of the foam.

Representative examples of the polyolefin employed as a material of the foam in the present invention are polyethylene, polypropylene, ethylene-propylene copolymer, ethylene-vinyl acetate copolymer, ethylene-acrylic acid copolymer and its metal salts, cross-linked above-mentioned polymers, and mixtures thereof. Mixtures of these polyolefin resins as a main component and other resins are also usable. To the polyolefin resin, there may be added additives in amounts not impairing the melt-adhesiveness of the expandable beads surface, e.g. filler such as talc, antiblocking agent such as zinc stearate, antioxidant, antistatic agent, stabilizer and coloring agent.

Expandable beads or pre-expanded beads are prepared in any known manners, and there are employed known foaming agents such as expanding gents which are liquid or gas at ordinary temperature and chemical blowing agents which generate gas by thermal decomposition. Although the diameter of the expandable bead is not particularly limited, it is usually selected from about 2 to about 7 mm. In order to improve the flowability and adhesiveness of the surface of the expandable beads at the time of heating, the expandable beads may be treated by adding and adhering to the beads a resin having a lower softening point than that of a polyolefin employed as a bead material, e.g. ethylene-vinyl acetate copolymer and low molecular weight polyethylene wax which are, for instance, usefully employed for treating expandable polyethylene beads, glycerin and completely hydrogenated castor oil.

Conventional bead foaming for preparing a polyolefin foam has been carried out generally by filling a mold which is able to close, but unable to seal, with expandable beads, heating the beads to melt and adhere them to each other by means of steam, etc., cooling the molten beads to solidify immediately after heating, and taking out the resulting foam from the mold. However, according to such a conventional process, many voids or gaps are present between the expanded beads constituting the foam as mentioned before, and it has been difficult to stably prepare a polyolefin foam which is substantially impervious to water.

In the present invention, in order to obtain a substantially water-impermeable polyolefin foam, the voids or gaps between the beads, which cause permeation of a liquid, are decreased by carrying out a particular bead foaming manner. That is to say, it is essential for preparing the substantially water-impermeable polyolefin foam of the present invention to, after the completion of heating and before conducting the cooling, allow the heated beads in a mold to stand in the state that the polyolefin resin maintains its flowability still at a high temperature. So long as the resin maintains the flowability after stopping the heating, for instance, after stopping the introduction of a heating medium such as steam, the longer the leaving time, the more the voids or gaps can be decreased. However, a too long leaving time may exert a bad influence upon the obtained foam, such as decrease of the size due to shrinkage of expanded beads and occurrence of wrinkle. The desirble leaving time is suitably determined with giving consideration to the kind of the polyolefin resin, the surplus power of pre-expanded beads at the time of expansion in a mold, the heating condition at the time of expansion, the degree of water-impermeability desired, and others. Usually, after stopping the heating the heated beads are left until the intracellular pressure lowers to 1.0 kg./cm$^2$ G, preferably 0.8 kg./cm$^2$ G, more preferably 0.6 kg./cm$^2$ G. The "intracellular pressure" means the resin pressure, i.e. the pressure measured by a pressure gauge provided on the mold surface enclosing a foam. For instance, in case of preparing a foam having a thickness of about 15 mm. from a cross-linked polyethylene, the heated beads are left in a mold preferably for about 45 to about 60 seconds.

When the heated beads are left in a mold, a ventilation valve of a mold may be either opened or closed. It is desirable that the leaving is conducted in the condition that the steam chamber of a mold is communicated to the outside, for instance, in the condition that a ventilation valve is opened.

It is also possible to further increase the water-impermeability by employing a mold capable of changing the volume of the cavity of the mold, e.g. a mold composed of split molds of movable type and fixed type. In that case, the expandable beads are filled in the mold in the state that the volume of the cavity is increased, and after heating the beads to melt-adhere the beads, the cavity volume is decreased to a prescribed cavity volume while the heated beads are left prior to the cooling. Further, in case of employing a mold capable of changing the volume of the cavity, the production of the voids or gaps between the beads can be more well decreased in such a manner that the expandable beads are filled in the cavity and heated, and during the leaving period prior to the cooling, the cavity volume is increased, for instance, by moving the mold in the direction of the thickness of a foam to be prepared, and is decreased to a prescribed cavity volume, desirably to the original volume at the time of filling the beads, before starting the cooling. The operation for increasing the cavity volume is conducted at the earlier stage of the leaving time after the completion of the heating and the operation for returning to the original volume is conducted at the later stage of the leaving time so long as the resin is still flowable, the better result is obtained.

The "prescribed cavity volume" means a volume of cavity corresponding to a volume to be possessed by the foam obtained as a product, and comprehends the operation such that the cavity volume is decreased to some extent before starting the cooling and the remaining cavity volume is further decreased to the original volume during cooling. The operation of changing the cavity volume may be repeatedly conducted within the leaving period.

The length of the movement of a mold in the direction of the thickness of a foam in the leaving period varies depending on the thickness and desired quality of a foam to be prepared, especially the thickness, and is suitably determined with paying these factors into consideration. In general, it is desirable that the length of the movement is from 10 to 50%, preferably 20 to 30%, of the thickness of a foam to be prepared. When the length of the movement is less than the above range, no remarkable effect of further improving the water-impermeability is obtained as compared with the process in which a mold is not moved.

There is not made clear the reason that the voids or gaps between the beads can be remarkably decreased by carrying out the beads foaming in a manner of leaving the heated beads in the state that the resin maintains the flowability after heating and before cooling. However, from the fact that with respect to a foam just after taking out a mold of steam heating type, the water content of the foam prepared by the process of the present invention is lower than that of the foam prepared by a conventional process in which the cooling is conducted immediately after the heating, it is considered that steam and drain, i.e. condensed hot water, resulting from the steam heating which are present between the beads, and a gas released from the inside of the cells are discharged outside the foam in the leaving period of a high temperature after the heating and the spaces resulting from the discharge are filled up with the resin by further expansion of the beads due to the inner pressure of the cells and the flowing action of the resin, and consequently a substantially water-impermeable foam is produced. Also, when a mold is moved in the direction of the expansion of the cavity volume, it is consider that the voids or gaps between the beads constituting the foam is further decreased by combined effects, i.e. an effect produced by the movement of a mold, of decreasing the resistance of the discharge of drain, steam and a gas to the outside of the foam and an effect produced by compressing the foam which expands to over the cavity volume prior to the movement of a mold, to the original cavity mold while the foam is still flowble, and consequently the further improved result is obtained.

Also, it is possible to prepare a substantially water-impermeable polyolefin foam by a process in which a water-permeable foam obtained once by a conventional process is placed in a mold again and heated and the heated foam is then subjected to the leaving followed by the cooling according to the present invention. This process practiced by placing a once obtained water-permeable foam in a mold and then treating is disadvantageous in points of stability of properties and cost as compared with the before-mentioned process of the present invention by which a substantially water-impermeable polyolefin foam can be prepared simply and inexpensively without passing through a troublesome step such as complicated secondary treatment, lamination or combination with other materials, or surface coating of a foam. However, this process is also adoptable to the preparation of the polyolefin foam of the present invention.

The substantially water-impermeable polyolefin foam of the present invention is very useful, e.g. as an interior material, particularly an interior material for preventing dew condensation employed as a covering material of a ceramic tank of a flush toilet which requires high eat insulating property and water proofing property. Also, the polyolefin foam of the invention is usable as a heat retaining vessel having excellent heat retaining effect and water proofing property, e.g. cooling box and heat retaining water bottle. It is the most effective to apply the process of the present invention to the preparation of a bead foaming product of polyethylene which is hard to stably melt-adhere and is easy to produce the voids or gaps in the resulting foam due to having a high gas permeability, despite of the present situation that polyethylene is the most widely put on the market and utilized.

The present invention is more specifically described and explained by means of the following Examples. These Examples are intended to illustrate the present invention and are not to be construed to limit the scope of the invention.

EXAMPLE 1

There was prepared a polyethylene foam shown in the accompanying drawing having a main thickness of 15 mm., an open portion in the shape of a right-angled triangle of 25 cm. in short side and 36 cm. in long side, and a depth of 32 cm. by employing a four-cavity mold of closed type having small holes which was divided into a movable mold and a fixed mold as follows:

Pre-expanded beads having a diameter of 3 to 5 mm., an apparent specific gravity of 0.036 and an inner pressure of 1.75 atm. were prepared by pre-expansion with dichlorodifluoromethane followed by air impregnation from cross-linked polyethylene particles having a gel fraction of 43.7% obtained by cross-linking a high pressure process polyethylene having a melt index of 1.5, a density of 0.924 g./cm.$^3$ and a softening point of 95° C. The obtained beads were immediately filled in the mold. After heating the beads by introducing steam of 155° C. to a steam chamber for 35 seconds, the heated beads were left for a prescribed time as shown in Table 1 in the condition that the mold was closed, but the steam chamber was communicated to the outside by opening the ventilation valve. The water cooling was then conducted for 120 seconds and the resulting foam was taken out from the mold.

The foam in the shape of a vessel was dried at 60° C. for 15 hours and was allowed to stand at room temperature for more than 2 hours to cool. The thus obtained vessel made of the polyethylene foam was placed in a ceramic tank and an exhaust port thereof was stoppered. Water was poured into the vessel to about 26 cm. in height, and with the lapse of time there was measured the permeation amount of water to the outside of the vessel, i.e. the amount of water which flowed out through the wall of the vessel into the ceramic tank. The measurement was conducted by wiping up the water on the outer surface of the vessel and the water on the inner surface of the ceramic tank with a filter paper, and the permeation amount was calculated from the weight increase of the filter paper.

The result is shown in FIG. 1.

TABLE 1

| Leaving time in foaming (second) | Accumulative permeation amount (ml.) | | |
|---|---|---|---|
| | After 24 hrs. | After 48 hrs. | After 120 hrs. |
| 0 | 0.1 | 0.7 | 5.2 |
| 60 | 0 | 0 | 0.1 |
| 90 | 0 | 0 | 0 |

As shown in Table 1, in case of the foam obtained by a process in which the leaving time after the heating was zero, i.e. a conventional process, the leakage of water was observed already after one day. On the other hand, in case of the foam obtained according to the process of the present invention in which the heated beads were subjected to the leaving, for instance, the foam obtained by leaving the heated beads for 90 seconds, no permeation of water was observed even after 5 days.

EXAMPLE 2

Pre-expanded beads having a diameter of 3 to 5 mm., an apparent specific gravity of 0.032 and an inner pressure of 1.60 atm. were prepared by pre-expansion with dichlorodifluoromethane followed by air impregnation from cross-linked polyethylene particles having a gel fraction of 47.8% obtained by cross-linking the same high pressure process polyethylene as employed in Example 1. The obtained beads were immediately filled in the same mold as employed in Example 1. After heating the beds by introducing steam of 155° C. to a steam chamber for 35 seconds, the pressure in the steam chamber was dropped to atmospheric pressure over 10 seconds in the condition that the ventilation valve of the mold was opened, and immediately the movable mold was moved backward by 5 mm. in a moment so as to make the mold the crack state. The heated beads were left for 50 seconds in the crack state, and after moving the movable mold again to the original position and cooling with water for 120 seconds, the resulting foam was taken out from the mold.

After drying and cooling the obtained foam in the same manner as in Example 1, the water permeation test was conducted.

The result is shown in Table 2.

TABLE 2

| Leaving time (sec.) | | Permeation amount (ml.) | | | |
|---|---|---|---|---|---|
| In the closed mold state | In the crack state | After 120 hrs. | After 240 hrs. | After 480 hrs. | After 720 hrs. |
| 0 | 0 | 5.0 | — | — | — |
| 60 | 0 | 0 | 0 | 0.8 | — |
| 10 | 50 | 0 | 0 | 0 | 0 |

As is clear from Table 2, the foam obtained by a process in which the mold was made a crack state in the leaving period, did not show the permeation of water even after one month, and it would be understood that the water-impermeability was further improved by changing the cavity volume of a mold while allowing the heated beads to stand after the heating.

EXAMPLE 3

By employing a mold which was similar to that used in Example 2, but capable of conducting the foaming in the condition that the cavity volume was increased, the same pre-expanded beads as used in Example 2 were filled in the mold of which the movable mold was moved backward by 5 mm. After heating the beads and dropping the pressure in the steam chamber to atmospheric pressure in the same manner as in Example 2, the movable mold was returned by 5 mm. and the water cooling was then conducted.

After drying and cooling the obtained foam, the water permeation test was conducted in the same manner as in Example 2. The obtained foam had an excellent water-impermeability.

What we claim is:

1. A substantially water-impermeable polyolefin molded foam of expanded polyolefin beads, said molded foam being prepared by the steps of filling a mold with expandable beads, heating the expandable beads to melt-adhere the surface of the beads to each other and to expand the beads, allowing the resultant heated beads to stand in the state that the polyolefin resin maintains its flowability whereby voids between the beads are decreased so that the resultant molded foam will have a water-impermeability measured by the volume of leakage of pressurized air of 0.020 kg/cm$^2$ through the thickness of the foam of not more than 10 ml/100 cm$^2$min, cooling the heated beads and removing the resultant molded foam from the mold.

2. The substantially water-impermeable polyolefin molded foam of claim 1, wherein the beads are heated to above about 95° C.

3. The substantially water-impermeable polyolefin molded foam of claim 1, wherein the resultant heated beads are allowed to stand for 45–90 seconds.

4. The substantially water-impermeable polyolefin molded foam of claim 1, wherein the heated beads are allowed to stand until the intercellular pressure lowers to 1.0 kg/cm$^2$G.

5. The substantially water-impermeable polyolefin molded foam of claim 1, wherein the expanded beads are filled in the mold in the state that the volume of the cavity of the mold is increased, and after the heating and before the cooling, the cavity volume is decreased to a prescribed volume.

6. The substantially water-impermeble polyolefin molded foam of claim 1, wherein after heating the beads, the volume of the cavity of the mold is increased; and before cooling the heated beads, the increased volume of the cavity is decreased to a prescribed volume.

7. The substantially water-impermeble polyolefin molded foam of claim 6, wherein the increased volume of the cavity is decreased to the original volume.

* * * * *